Nov. 14, 1933.  K. MIZOBATA  1,934,941
METHOD OF PREPARING DRIED YEAST
Filed Dec. 16, 1930
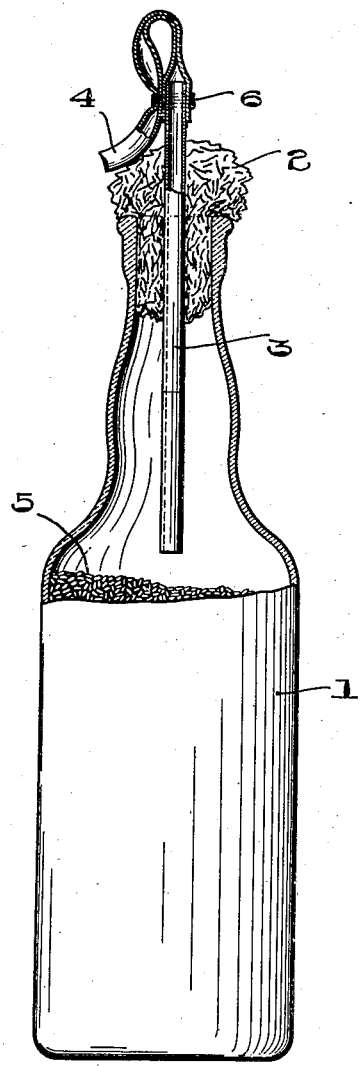
Inventor
K. Mizobata
By Marks & Clerk
Attorneys.

Patented Nov. 14, 1933

1,934,941

UNITED STATES PATENT OFFICE 1,934,941

METHOD OF PREPARING DRIED YEAST

Kyutaro Mizobata, Tokyo, Japan

Application December 16, 1930, Serial No. 502,814, and in Japan December 27, 1929

1 Claim. (Cl. 99—8)

The present invention relates to the method of preparing dried yeast, which consists in causing the previously-cultivated pure yeast to be adsorbed by steamed rice kept in a sterilized condition in a suitable vessel. The object thereof is to obtain the yeast which is convenient for transportation and preservation without the fear of being spoiled by harmful bacteria owing to the oozing out of the juice, even if it is shaken and also which is used for the leaven of "Saké" (Japanese wine) as it is.

The accompanying drawing illustrates an example of carrying this invention into practice, showing a front view partly cut off. Now, to transport pure yeast it is usual to separate the cleared part of the inoculated liquor and collect the yeast deposited on the bottom of the vessel and then apply a cotton stopper thereto or compress muddy yeast to drain the juice as well as possible, or cause the juice to be adsorbed by fibrous material and subsequently dry the yeast at a low temperature to make so-called dried yeast. However, when the yeast is transported in a liquid form, the cotton stopper is apt to get wet with nutrient medium owing to the shaking or the dislocation of the yeast, thus making the cause of the intrusion of bacteria to spoil the yeast. Also, the compressed or dried yeast is not only expensive, but is attacked by harmful bacteria during the operation. However, according to this invention such a drawback is removed by making pure muddy yeast adsorbed by the steamed rice kept in a sterilized condition in a suitable vessel.

The following is an example of carrying this invention into practice:—

Put steamed rice 5 in a suitable bottle 1 and apply thereto a cotton stopper 2 pierced with a glass tube 3, the end of which is inserted in a rubber tube. After sealing the end of the said rubber tube tightly with a cotton stopper, heat the bottle for sterilization and then leave it to cool. Pour therein through the rubber tube 4 and glass tube 3 the muddy yeast obtained by removing the cleared liquor of inoculated medium, so as to cause it to be adsorbed by the steamed rice. Then, bind the rubber tube 4 with thread 6 or tighten it with a pinch-cock or the like.

As according to the present invention the juice, namely the nutrient medium is wholly adsorbed by the steamed rice, it does not leak out, however it may be shaken or tumbled, and moreover there is no fear of the cotton stopper getting wet. Thus, no danger attends the transportation or preservation. Moreover, it can be used only by opening the vessel and adding it to the leaven of "Saké" (Japanese wine) or dough as it is adsorbed by the steamed rice. Therefore, it is very convenient.

I claim:

Method of preparing dried yeast, which consists in first steaming whole rice, then sterilizing the rice by heating, then cooling the rice and causing previously cultivated pure yeast to be adsorbed by the steamed rice and finally storing in a suitable vessel.

KYUTARO MIZOBATA.